United States Patent [19]

Edwards

[11] Patent Number: 5,183,613
[45] Date of Patent: Feb. 2, 1993

[54] PROCESS FOR THE PREPARATION OF SOLVENTLESS, LOW FRICTION, ABRASION-RESISTANT COATINGS FOR ELASTOMERIC SUBSTRATES

[75] Inventor: Charles O. Edwards, Akron, Ohio

[73] Assignee: GenCorp Inc., Fairlawn, Ohio

[21] Appl. No.: 773,744

[22] Filed: Oct. 10, 1991

Related U.S. Application Data

[62] Division of Ser. No. 571,485, Aug. 22, 1990, abandoned.

[51] Int. Cl.⁵ .................................................. B29C 47/06
[52] U.S. Cl. .................................. 264/171; 264/177.1; 264/177.18; 425/131.1; 425/462
[58] Field of Search ... 264/177.1, 171, 177.16–177.19; 425/131.1, 133.5, 462

[56] References Cited

U.S. PATENT DOCUMENTS

| | | | |
|---|---|---|---|
| 3,193,428 | 7/1965 | Palmer | 156/244 |
| 3,517,097 | 6/1970 | Mixell et al. | 264/177.18 |
| 3,706,173 | 12/1972 | Taylor | 52/716 |
| 3,904,470 | 9/1975 | Fukuki et al. | 156/306 |
| 3,962,018 | 6/1976 | Costemalle et al. | 156/306 |
| 4,076,891 | 2/1978 | Yardley et al. | 428/517 |
| 4,090,906 | 5/1978 | Zoller | 156/244.27 |
| 4,118,166 | 10/1978 | Bartrum | 425/462 |
| 4,169,180 | 9/1979 | McDonagh | 428/215 |
| 4,184,000 | 1/1980 | Denman | 428/347 |
| 4,198,983 | 4/1980 | Becker et al. | 128/349 |
| 4,292,355 | 9/1981 | Bonis | 428/35 |
| 4,381,273 | 4/1983 | Azzola | 425/131.1 |
| 4,467,061 | 8/1984 | Yamamoto et al. | 524/87 |
| 4,511,526 | 4/1985 | Yamagughi | 264/177.17 |
| 4,537,825 | 8/1985 | Yardley | 428/327 |
| 4,600,461 | 7/1986 | Guy | 156/244.12 |
| 4,676,856 | 6/1987 | Shigeki et al. | 156/201 |
| 4,698,193 | 10/1987 | Bernitz et al. | 264/171 |
| 4,701,376 | 10/1987 | Hermann et al. | 428/358 |
| 4,833,194 | 5/1989 | Kuan et al. | 524/525 |
| 4,913,976 | 4/1990 | Brooks et al. | 428/494 |
| 4,923,759 | 5/1990 | Brooks et al. | 428/521 |

FOREIGN PATENT DOCUMENTS

| | | |
|---|---|---|
| 43160/79 | 9/1979 | Austria . |
| 49435/79 | 2/1980 | Austria . |
| 0009884 | 4/1980 | European Pat. Off. . |
| 0325573 | 1/1989 | European Pat. Off. . |
| 0325830 | 8/1989 | European Pat. Off. . |
| 3503200 | 5/1986 | Fed. Rep. of Germany ... 425/131.1 |
| 2580285 | 10/1986 | France ... 264/171 |
| 57-43849 | 3/1982 | Japan ... 264/171 |
| 62-227732 | 10/1987 | Japan ... 264/171 |
| 1-178046 | 7/1989 | Japan ... 264/171 |
| 1423541 | 2/1976 | United Kingdom . |
| 2128899 | 5/1984 | United Kingdom . |

OTHER PUBLICATIONS

European Search Report on Application No. EP 91 30 4996 completed in the Hague Jun. 29, 1992 by Examiner B. R. Bettels of the European Patent Office.
The corresponding U.S. Application was Ser. No. 07/571,485, filed Aug. 22, 1990, which is the parent of divisional application Ser. No. 07/773,744.

*Primary Examiner*—Jeffery Thurlow

[57] ABSTRACT

A process to prepare a glass run channel composite of the type utilized in vehicle applications for sealing against window glass, includes a cured elastomeric substrate having one or more sealing surfaces, and a polyolefin compound having a low melt index and a high density, and optionally containing a softening compound and other additives. The polyolefin compound is solvent-free and substantially melted when contacted with the sealing surfaces of the elastomeric substrate prior to cure, and upon cure of the elastomeric substrate, the polyolefin compound adheres to the substrate and provides a solid, low-friction abrasion-resistant coating on the sealing surfaces of the substrate for sealing against a window introduced into the glass run channel.

12 Claims, 2 Drawing Sheets

PROCESS FOR THE PREPARATION OF SOLVENTLESS, LOW FRICTION, ABRASION-RESISTANT COATINGS FOR ELASTOMERIC SUBSTRATES

FIELD OF THE INVENTION

Coextrusion bonding process of the invention relates to solvent-free coatings for elastomeric substrates, and in particular to solventless, low-friction, abrasion-resistant polyolefin coatings for the sealing surfaces of thermosetting elastomeric substrates such as a glass run channel in an automotive application.

BACKGROUND

Various elastomers such as ethylene-propylenediene terpolymer (EPDM) and styrene-butadiene copolymer have been utilized for many years in applications requiring a sealing contact between the elastomer and another object, such as in glass run channels which are positioned in the window frames of automobile doors to provide a seal between the window frame and the glass.

The elastomer utilized in glass run channel applications generally is flexible to provide a good seal of the elastomer against the window glass without the application of excessive force, and must also display good weatherability properties. However, most suitable flexible elastomers typically lack the low-friction, abrasion or wear-resistant properties necessary for ease of travel of window glass within the glass run channel and long life of the glass run channel itself, respectively.

Therefore, low-friction, wear-resistant coatings for glass run channel have been developed which are applied to the elastomeric substrate usually as solvent-based sprays, or which are applied to the substrate after surface treatment of the substrate with a primer, adhesive, or the like. However, environmental concerns directed to the toxicity and volatility of such solvent-containing materials, and EPA limits on organic solvent emissions, have created the incentive for the manufacture of glass run channel having a solventless or high solid, low-friction, abrasion resistant coating.

Moreover, it has heretofore been difficult to obtain the necessary strong adhesion between such low-friction wear-resistant coatings and the substrate material such as EPDM. For example, EPDM has a low surface energy so wetting is difficult. In addition, EPDM has a low concentration of reactive groups, that is, it contains few carbon-carbon double bonds which makes chemically bonding thereto difficult. Methods which have been used to improve adhesion to EPDM include surface treatments such as flame, ozone, and chlorination. Such surface treatments typically raise the surface energy of the EPDM to levels closer to that of common coatings resulting in improved adhesion. However, such surface treatments are costly and complicate the manufacturing process for applications such as glass run channel. Another method used to improve adhesion has been the application of the aforementioned primer layers. Such layers provide intermediate surface energy between the substrate and coating for relatively good adhesion to each. However, this method also increases cost and normally requires the use of additional solvent, which is undesirable, as discussed above.

As mentioned above, low friction and abrasion resistance also are requirements for glass run channel coating materials. The base polymer in such coatings contributes much of the low-friction and abrasion-resistant properties. Thus, low-friction rubbers such as polyurethanes are generally regarded as good base polymers for coatings. However, in most cases, polyurethanes must be applied to an EPDM elastomer which has been either surface treated or primer coated to achieve good adhesion therebetween.

In addition, many prior coatings contain additives to lower friction and increase abrasion-resistance. Polytetrafluoroethylene (PTFE or Teflon ®) particulates and silicone fluids are conventional additives for friction reduction and may also be useful for improving abrasion-resistance. Although useful in selected coatings, in many cases it is preferable to avoid using such PTFE and silicone additives. More specifically, in certain instances, PTFE particles tend to agglomerate thus reducing their effectiveness, and silicone fluids often are too incompatible with coating materials and phase separate. In addition, silicone fluids sometimes cause poor adhesion between the coating and the substrate. Moreover, silicone fluids in solvent-based formulations may by contact or by dispersion of fine particles in the atmosphere contaminate other unrelated areas of a manufacturing plant and adversely affect adhesion in certain products.

U.S. Pat. No. 3,904,470 to Fukuki et al relates to a method for bonding rubber to plastics by contacting a vulcanized shaped structure of an ethylene/propylene copolymer rubber on an ethylene/propylene/diolefin copolymer rubber with a polyolefin plastic at a temperature above the softening point of said polyolefin plastic, said vulcanized shaped structure consisting of a blend of (i) 60 to 97 percent by weight of an ethylene/propylene copolymer rubber having an ethylene content of 40 to 85 mole percent or an ethylene/propylene/diolefin copolymer rubber having an ethylene content of 40 to 85 mole percent and 0 to 100 percent, based on the weight of the copolymer rubber, of a rubber component other than the above copolymer rubbers and a butyl rubber, and (ii) 3 to 40 percent by weight of specific crystalline polyethylene or polypropylene plastic.

U.S. Pat. No. 3,962,018 to Costemalle et al relates to a multilayer composition prepared by a process comprising applying an intimately mixed blend of a thermoplastic polyolefin and an elastomer to the surface of an elastomer and bonding said blend to said surface by heating and application of pressure. Thus a film of the intimately mixed blend may be applied to the surface of the elastomer. Also, a motor-car door seal can be produced by extruding to the desired profile the intimately mixed blend of thermoplastic polyolefin and elastomer so as to form the base foot and bonding the elastomer seal to the extruded section.

U.S. Pat. No. 4,076,891 to Yardley et al relates to a method of producing a molded plastic rubber composite comprising injection or transfer molding a substantially linear crystalline low pressure solution olefin polymer so that it is brought, in a molten state, into contact with a prevulcanized rubber component containing up to 70 percent by volume of a rubbery olefin polymer. The plastic-rubber composite produced by this method may be used in applications in which hitherto rubber-metal composites have been used, for example valve diaphragms, tire valve bodies, shock absorbers, engine mountings, vibration dampers, compression springs, torsion bushes, flexible drive couplings, etc.

U.S. Pat. No. 4,090,906 to Zoller relates to a method of making a trim strip comprising the extrusion of a vinyl material to form a body which is so shaped that it can be confined in a peripheral slot in a roll, thereby to permit substantial pressure to be applied on the extruded body and a decorative strip by a mating roll. The top portion of the extruded body has side extensions which are supported by the edges of the recessed roll; thus, substantial pressure can be applied on the entire top of the decorative surface strip and the body to produce an adhesive bond or a bond by heat sealing. After the body is cooled, it is advanced through a number of aligned milling cutters to machine aligned recesses in the sides of the body to produce a retention cutout. After being machined to depth, the trim strip is advanced through a pair of grinding wheels to accurately form and space the recesses. During the extruding operation, a coated wire may be embedded within the body in the conventional manner.

U.S. Pat. No. 4,169,180 to McDonagh relates io to a laminate which is useful as a construction material. It comprises: (1) a base layer of a synthetic resin having inferior weather-proof characteristics; and (2) a protective layer of a crosslinked acrylate and/or methacrylate/crosslinked styrene-acrylonitrile/uncrosslinked styrene-acrylonitrile polymer composition attached to the base layer. The laminate can be used as a material for siding, gutter systems, downspouts, soffit and fascia systems, shutters, window casings and the like.

U.S. Pat. No. 4,184,000 to Denman relates to a coupling element comprising elongated thermoplastic strip material structured to provide that, on application thereto of heat in the range from about 300° F. to about 500° F. the outer portion thereof becomes fluidly adhesive, and is particularly adapted thereby to quickly form a ready bond and a clean seal between different materials, especially between glass and metal parts. While under the application of heat in the range specified, the outer portion of the element becomes fluidly adhesive, the inner or core portion of the element retains, as originally provided, an essentially stable form which accommodates and conforms to the contour of an applied load. On self cooling in place the strip coupling device provides a bond and seal between parts of unlike materials. In preferred embodiments and applications the invention provides for an installation of a window, windshield or like unit. Elements of the invention are reversible. Once an element is in place and serving as a bond, if subjected to heat in the prescribed temperature range of 300° F. to 500° F., the outer portion of the element becomes fluid while the stability of the core thereof is maintained. This enables that the element may be removed from between the parts for which it formerly served as a bond.

U.S. Pat. No. 4,198,983 to Becker et al relates to a catheter, preferably a balloon-type catheter, which is disclosed in which the catheter shaft is made of a thermoplastic material and thus may be extrudable, the shaft consisting essentially of (a) from 40 to 70 percent by weight of an elastic composition which comprises: from 50 to 99.5 percent by weight of a block copolymer having thermoplastic rubber characteristics with a central, rubber polyolefin block and terminal blocks of polystyrene, and optionally including up to about 45 percent by weight of polypropylene, plus from 0.5 to 10 percent by weight of a crosslinked organic silicone elastomer; and (b) from 30 to 60 percent by weight of a hydrophobic oil-type plasticizer to provide the desired degree of softness of said elastic composition.

U.S. Pat. No. 4,292,355 to Bonis relates to a moisture-impervious plastic container thermally formed from a coextruded sheet including a layer of polypropylene directly adhered to a layer of butadiene-styrene polymer.

U.S. Pat. No. 4,467,061 to Yamamoto et al relates to a polyolefin composition with an improved weather resistance, which comprises a polyolefin blended with (1) a benzotriazole compound, (2) a heterocyclic hindered amine compound and (3) a phenyl benzoate compound or nickel complex compound.

U.S. Pat. No. 4,537,825 to Yardley relates to a method of making a bonded composite of (i) a thermoplastic elastomeric blend of vulcanized EPDM particles not more than 50 microns in size disposed in a thermoplastic linear crystalline polyolefin continuous phase, with (ii) a vulcanized EPDM or EPM rubber composition containing less than 50 percent (preferably 5 percent to less than 40 percent by volume of rubber), comprises fusing the thermoplastic elastomeric blend and solidifying it in contact with the vulcanized rubber composition in the absence of an adhesive interlayer. Preferably the blend is extruded onto the vulcanized rubber composition. Preferably the linear crystalline polyolefin in the thermoplastic blend has a melt flow index of at least 0.25 when measured according to the test conditions ASTM D1238-65T and is selected from polypropylene, propylene copolymers, high density polyethylene and high density ethylene copolymers.

U.S. Pat. No. 4,600,461 to Guy relates to an apparatus and process for producing an extruded plastic material product which consists of an inner foamed thermoplastic cellular core and an outer non-porous thermoplastic skin extending along at least one side of the core. In the process, a foamable thermoplastic material is extruded through a first die outlet to produce a foamed thermoplastic material. After exiting the die outlet, a film of non-porous thermoplastic material is applied along at least one side of extruded foamed material. Next, the extruded foamed material and the non-porous film is fed through a forming die which shapes and seals the materials into the desired cross-section shape.

U.S. Pat. No. 4,676,856 to Shigeki et al relates to a weather strip for a vehicle which has a channel-shaped base portion having a U-shaped cross section and provided with retaining lips for retaining a flange of a vehicle body, a seal portion integrally projecting from an outer surface of the base portion, and a core member made of synthetic resin and having a U-shaped cross section, which is embedded in the channel-shaped base portion. The method for producing such a weather strip as described above includes the steps of extruding a strip-shaped thermoplastic synthetic resin sheet having stress concentrating portions which are broken when bending stress is applied thereto, with rubber material to obtain an extruded body, heating the obtained extruded body for curing the rubber material thereof, applying bending stress to the cured extruded body for separating the core member in the stress concentrating portion and bending the separated core member with the rubber material to have a U-shaped cross section.

U.S. Pat. No. 4,698,193 to Bernitz et al relates to a method and apparatus for producing sealing strips and similar profiled strips of rubber and rubber-like elastomers. Rubber-like profiled sealing strips for window or door openings are frequently provided with overlay strips to facilitate installation, to enhance the relative movements, or for aesthetic-visual reasons. The material of these overlay strips generally differs considerably from the material of the base main strip. The manufacture of such two-material profiles can be undertaken in a single extrusion step by joining and directly combining a prefabricated overlay strip with the main strip in the extrusion head of an extrusion press, where the shape is provided for the profiled strip. By stretching the overlay strip, the adhesion of the latter to the main strip is improved.

U.S. Pat. No. 4,701,376 to Hermann et al relates to a profiled rubber strip seal for bordering window and door openings. To simplify installation, or to promote relative movement between the strip and windowpanes, such seals are provided with overlay strips of friction-reducing material, especially synthetic materials that contain fluorine. To provide favorable conditions for satisfactory bonding between the overlay strips and the main strip, and also to make it possible to use difficult to handle materials, the elastomeric mixture of the main strip is altered by including therein silicic acid.

U.S. Pat. No. 4,833,194 to Kuan et al relates to blends of crystalline and amorphous polymers which are utilized to form uncured thermoplastic elastomer compositions which have good properties such as processability, tensile strength, tear strength, good weatherability, good friction, and especially low deformation at high temperatures as about 180° F. The thermoplastic elastomer composition contains amorphous ethylene-propylene type rubber, crystalline ethylenepropylene type rubber, and crystalline olefins such as polyethylene. The crystalline polymers generally impart the necessary thermoplasticity for melt processing, and the like.

European Patent Application 0 325 573 relates to shaped articles, such as coatings for wire and cable which are prepared by crosslinking compositions which are mixtures of (A) a polyolefin containing hydrolyzable silane groups and (B) elastoplastic blends of particles of rubber compounds dispersed in a continuous phase of thermoplastic polymer compatible with (A), wherein the rubber compound is at least partially cured.

SUMMARY OF THE INVENTION

The present invention is directed to a process for a glass run channel composite of the type utilized in automotive applications for sealing against window glass. The glass run channel composite includes a thermosetting elastomeric substrate having one or more sealing surfaces, and a polyolefin compound having a low melt index and a high density, and optionally containing a softening compound and other additives. The polyolefin compound is solventless and substantially melted when contacted with the sealing surfaces of the elastomeric substrate prior to cure thereof, and upon cure of the elastomeric substrate, the polyolefin compound is adhered to the substrate and provides a solid, low-friction, abrasion-resistant coating on the sealing surfaces of the substrate for sealing against a window introduced into the glass run channel.

BRIEF DESCRIPTION OF DRAWINGS

Similar numerals refer to similar parts throughout the drawings.

DETAILED DESCRIPTION OF THE INVENTION

Conventional automotive glass run channels heretofore have included a weather-resistant elastomeric substrate having a low-friction, wear-resistant coating applied to the glass sealing surfaces thereof through the use of solvents in one form or another. However, solvent-based coatings have fallen into disfavor due to various factors such as EPA regulations limiting the emissions of organic solvents from manufacturing plants. In response to these factors, the present invention is directed to a solventless, low-friction, abrasion-resistant coating for glass run channel elastomeric substrates.

Figure 1:
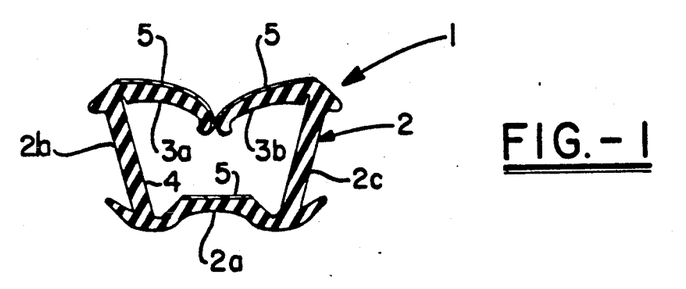
FIG. 1 is a cross-sectional view of a first embodiment of a glass run channel having the solventless, low-friction, abrasion-resistant coating of the present invention applied thereto.

FIG. 1 shows a first embodiment of a glass run channel having the coating of the present invention applied thereto, indicated generally at 1. Glass run channel 1 is an integrally formed one-piece member and includes a channel member or substrate 2 having a base 2a, sidewalls 2b and 2c, and a pair of similar, inwardly extending opposed lips 3a and 3b which extend generally horizontally across a channel 4 defined by base 2a and sidewalls 2b, and 2c. Substrate 2 is formed of any commercially available flexible elastomer of the type which are well known to the art and to the literature, and which provide good sealing against a glass window surface without the application of excessive pressure against the glass surface. The flexible elastomer of which substrate 2 is formed must also display good weatherability properties. The flexible elastomer formed substrate 2 may also be highly extendible with conventional additives such as carbon black and the like to maintain a reasonable price of the substrate. Desirable elastomers of which substrate 2 can be formed generally include curable or thermosetting elastomers. More particularly, desirable elastomers include butadiene-based rubbers of styrene-butadiene rubber and nitrile rubber or acrylonitrile-butadiene rubber, and natural rubber or synthetic isoprene rubber. A preferred elastomer is ethylene-propylene terpolymer, also commonly referred to as EPDM.

With respect to styrene-butadiene rubber, which is by far the most widely used type of synthetic rubber, any of the commercially available, conventional styrene-butadiene rubbers containing less than about 30 percent of styrene monomer based upon the total weight of the rubber forming monomers therein can be utilized in forming substrate 2.

Useful nitrile rubbers include conventional nitrile rubbers which are known to the art and to the literature, that is, rubbers generally made from one or more monomers of acrylonitrile or an alkyl derivative thereof with one or more conjugated dienes and optionally one or more monomers of acrylic acid, or an ester thereof, or a dicarboxylic acid. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomers is from about 0 percent to about 50 percent by weight, desirably from about 0 to about 40 percent by weight, and preferably from about 0 to about 30 percent by weight based upon the total weight of the nitrile rubber forming monomers. That is, although an acrylonitrile monomer or derivative thereof is generally utilized, it need not always be utilized as known to those skilled in the art. The conjugated diene monomers generally have from 4 to 10 carbon atoms with 4 to 6 carbon atoms being preferred. Examples of specific conjugated diene monomers include isoprene, hexadiene, and the like, with butadiene being most preferred. The amount of such conjugated dienes is generally from about 50 percent to about 100 percent; desirably from about 60 percent to about 100 percent; and preferably from about 70 percent to about 100 percent by weight based upon the total weight of the nitrile rubber forming monomers. Such nitrile rubbers can also contain optional comonomers as known to those skilled in the art as well as to the literature. Such optional comonomers generally include acrylic acid or various esters thereof, dicarboxylic acids, or combinations thereof. The acrylic acid or the esters thereof can generally be represented by the formula Where $R^1$ is hydrogen or an alkyl having from 1 to 4 carbon atoms, and wherein $R^2$ is hydrogen, or (a) a nitrile-containing ester wherein the ester portion contains a total of from 1 to 8 carbon atoms, (b) a hydroxyl-containing ester wherein the ester portion contains a total of from 1 to 8 carbon atoms, (c) an unsaturated epoxy-containing monomer which contains a total of from 3 to 12 carbon atoms, or (d) or combinations thereof. When $R^2$ is hydrogen, examples of suitable acids include acrylic acid, methacrylic acid, and the like. When $R^2$ is a nitrile containing ester, examples of suitable optional monomers include cyanoethyl acrylate, cyanoethyl methacrylate, cyanobutyl ether acrylates, and the like. Examples of suitable hydroxyl containing esters include hydroxy ethyl methacrylate, hydroxy propyl methacrylate, hydroxy ethyl acrylate, and the like. Examples of suitable epoxy containing monomers include glycidyl methacrylate, glycidyl acrylate, allyl glycidyl ether, and the like. The dicarboxylic acids generally contain from 3 to about 10 carbon atoms and specific examples include maleic acid, fumaric acid, itaconic acid, and the like.

When utilized, the amount of the above-noted optional monomers is generally from about 0.1 to about 25 percent by weight and preferably from about 4 to about 12 percent by weight based upon the total weight of the nitrile rubber forming monomers. As noted hereinabove, although generally utilized, an acrylonitrile monomer or an alkyl derivative thereof need not always be utilized in association with the conjugated diene monomers. In such an event, one or more of the above-noted optional monomers are utilized.

With respect to the most preferred elastomeric substrate, that is, EPDM rubber, any suitable, commercially available conventional EPDM rubber, as are well known to the art and to the literature, can be utilized in the present invention. Most commercially available EPDM rubbers have an ethylene unit content of from about 25 percent by weight to about 80 percent by weight based upon the total weight of the ethylene units and the propylene units. The diene is a non-conjugated monomer having from about 5 to about 10 carbon atoms. Specific non-conjugated dienes include pentadiene, dicyclopentadiene (DCP), hexadiene, norbornene, methyl norbornene, ethylidene norbornene, heptadiene, and the like. An example of a particularly well-suited diene is ethylidene norbornene. It is understood that the preferred EPDM rubber can be cured by any suitable conventional curing agent such as are well known to the art and to the literature, with a desirable curing agent being peroxide and a preferable curing agent being sulfur. Inasmuch as it is desirable that the EPDM rubbers have high amounts of unsaturation therein especially when a sulfur curing agent is utilized as is well known to those skilled in the art, the amount of the diene monomer repeating unit is generally from about 1 to about 15 percent by weight of the terpolymer system with from about 6 to about 12 percent being desired and from about 8 to about 10 percent being preferred. Of course, the selected EPDM rubber must be flexible in order to achieve good sealing against the window glass without the application of excessive force against the glass.

In accordance with one of the main features of the present invention, a thin, uniform, polyolefin coating 5 is adhered to the outer surface of lips 3a and 3b and the inner surface of base 2a of substrate 2 (FIGS. 1-3) in any conventional manner such as coextrusion methods in the presence of a sufficiently high processing temperature, such as during cure of substrate 2, wherein the polyolefin is substantially melted as the substrate is extruded and cured. By substantially melted, it is meant that the polyolefin used to form coating 5 is formable or thixotropic, so that polyolefin coating 5 will flow under shear applied by suitable processing equipment. Subsequent cooling to room temperature results in an unexpectedly excellent adhesive bond between polyolefin coating 5 and elastomeric substrate 2 without the use of solvents. The base polyolefin utilized in coating 5 preferably has a low melt index or high molecular weight to prevent running or pooling of the substantially melted coating during application to the uncured substrate. It is, of course, understood that coating 5 itself also has thixotropic low flow characteristics as discussed above, so that such running and pooling thereof is avoided, and the low melt index or high molecular weight of the base polyolefin utilized in coating 5 results in a coating 5 having such low flow characteristics. By substantially melted it is meant that from about 50 percent to about 100 percent of coating 5 is in a melt phase, desirably between about 75 percent and 100 percent is in a melt phase, preferably from about 95 percent to about 100 percent is in a melt phase, and most preferably 100 percent or all of the coating 5 is melted. Coating 5 most preferably is completely melted for ease of processing, that is, to enable coating 5 to pass easily through an extruder as compared to a substantially unmelted coating which would be "lumpy" and have difficulty in passing through an extruder. The base polyolefins utilized in the coating 5 of the present invention generally should also display good adhesion to the substrate, adequate flexibility for the sealing function, good processability, be low-friction and abrasion-resistant, and be solvent-free. Other desirable properties of the polyolefin coating include weatherability against sun, water, ozone, oxygen, fungus, etc., and a uniform surface having a specified smoothness and gloss level. Preferred polyolefins for use in the present invention include polypropylene, polyethylene, and ethylene-propylene copolymer wherein the percent of ethylene by weight of the ethylene and propylene monomers if the copolymer is non-block or random is from about 0 to about 20 percent or from about 80 percent to about 100 percent; desirably from about 0 percent to about 10 percent or from about 90 percent to about 100 percent; and preferably from about 0 percent to about 5 percent or from about 95 percent to about 100 percent. If the ethylene-propylene copolymer is a block copolymer, the percent of ethylene by weight of the ethylene and propylene monomers is from about 0 percent to about 30 percent or from about 70 percent to about 100 percent; and preferably from about 5 percent to about 25 percent or from about 75 percent to about 95 percent. If p-olyethylene is selected for coating 5, the selected polymers should have a density of at least 0.91 gms./cc, desirably at least 0.94, and preferably at least 0.96. Moreover, if polyethylene is selected it should have a melt index of from about 0.1 to about 10; desirably from about 0.2 to about 5; and preferably from about 0.2 to about 1. Likewise, if polypropylene is the selected polyolefin coating 5, it should have a density of from about 0.89 to about 0.92; and preferably from about 0.91 to about 0.92. Also, polypropylene, if selected, should have a melt index of from about 0.1 to about 10; desirably from about 0.2 to about 5; and preferably from about 0.2 to about 1. If an ethylene-propylene block or random copolymer is the coating 5 of choice, it has a density of greater than about 0.9, desirably greater than about 0.91, and preferably greater than about 0.93, and further each have a melt index of from about 0.1 to about 10, desirably from about 0.2 to about 5, and preferably from about 0.2 to about 1.0.

Figure 2:
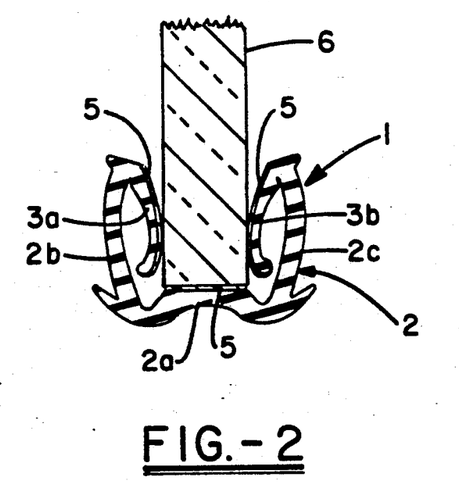
FIG. 2 is a cross-sectional view similar to FIG. 1, and showing window glass introduced into the glass run channel and sealed against the coated lips and base of the channel.
Figure 3:
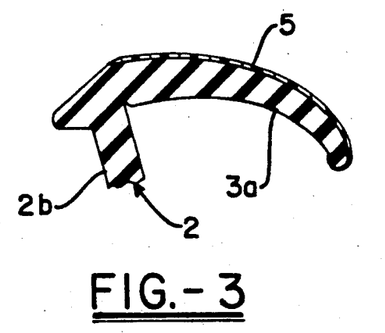
FIG. 3 is an enlarged fragmentary, cross-sectional view of one of the coated lips of the glass run channel of FIG. 1.

In accordance with another feature of the present invention, optional additives can be utilized to improve the various desired properties of polyolefin coating 5. One class of additives are various softening agents which can be blended with the polyolefin base polymer of coating 5 when it is necessary to retain flexibility in substrate 2, such as on lips 3a and 3b as shown in FIGS. 1 and 2 to allow glass 6 to be introduced into channel 4 without encountering excessive resistance. However, it is understood that such softening agents are optional and not necessary in certain applications, such as when coating 5 is applied to base 2a of substrate 2 (FIGS. 1 and 2). Desirable softeners include any commercially available polyolefin-based thermoplastic elastomers which are well known to the art and to the literature. Such desirable softening agents contain cured, non-melt elastomers such as cured EPDM in an amount of up to about 50 percent by weight of the softening agent and polyolefin compound, and preferably from about 25 percent to about 35 percent by weight. The incorporated EPDM preferably is cured so that the low-friction and abrasion-resistant properties of the polyolefin-based coating are not adversely affected. Santoprene ®, a lightly crosslinked blend of polypropylene and EPDM, is a preferred softening agent, especially when the polyolefin base polymer is polypropylene, to provide a suitably flexible surface coating 5 so that lips 3a and 3b of substrate 2 retain their flexibility for sealing against window glass 6 without excessive force when the glass is introduced into channel 4, as shown in FIG. 2. More particularly, Santoprene ® is a dynamic vulcanizate of EPDM and polypropylene. Small dispersed EPDM rubber particles in the crosslinked blend result in softness of the coating 5 with little reduction in the low-friction or abrasion resistant properties of the coating. The degree of softening can be adjusted by changing the amount of EPDM in the dynamic vulcanizate. A preferred softening agent, especially when the polyolefin base polymer is polyethylene is a lightly crosslinked blend of polyethylene and EPDM. Santoprene ® or the polyethylene/EPDM blend is blended with the polyolefin coating 5 in an amount of up to about 80 percent by weight of the Santoprene ® or polyethylene/EPDM blend and polyolefin coating; desirably from about 30 percent to about 70 percent; and preferably from about 40 percent to about 60 percent.

Another class of additives are compounds which improve the abrasion-resistance of the polyolefin coating such as inert microspherical glass beads and the like. The addition of microspherical glass beads to the polyolefin coating results in further improvements in abrasion-resistance against a glass window without sacrificing other properties of the polyolefin coating. More particularly, microscopic examination of abraded surfaces containing glass beads reveals abrasion on the glass beads themselves. Thus, the abrasive load is borne by the glass beads rather than the polymeric components of the coating. The glass beads are used in an amount of from about 0 percent to about 40 percent based on the weight of the glass beads and the polyolefin coating; desirably from about 5 percent to about 25 percent; and preferably from about 10 percent to about 20 percent. Less preferably, non-fluxing crystalline fillers such as thermoplastic nylon or ultra-high molecular weight polyethylene in particulate form can be added to the polyolefin coating to improve abrasion resistance. If thermoplastic nylon is selected, it is utilized in an amount of from about 0 percent to about 10 percent; desirably from about 2.5 percent to about 10 percent; and preferably from about 5 percent to about 10 percent; and if ultra-high molecular weight polyethylene is selected, it is used in an amount from about 0 percent to about 25 percent; desirably from about 2.5 percent to about 10 percent; and preferably from about 5 percent to about 10 percent based on the weight of the nylon or ultra-high molecular weight polyethylene particulate filler and the polyolefin compound.

Still another class of optional additives are various lubricants which lower the friction and thereby increase the abrasion-resistance of the polyolefin coating. This class includes high-melting thermoplastics such as polytetrafluoroethylene, i.e. Teflon ®, and the like, and oils such as silicone oil, for example, or other liquid lubricants as heretofore used in prior elastomer substrate coating materials. However, it is to be understood that such lubricants may not be necessary inasmuch as coating 5 of the present invention displays low-friction and high abrasion-resistant properties without the addition of such lubricants.

In addition, various conventional compounding agents which are well known to the art and to the literature can be utilized in conventional amounts such as various processing aids, stabilizers, fillers, extenders, and the like. Processing aids, which are helpful in avoiding rough extrusion of coating 5 and in inhibiting shrinkage of the coating during cure of the substrate, include polyolefins having a different molecular weight than the base polyolefin of coating 5, hydrocarbon waxes, etc. Various stabilizers can be utilized to protect the polyolefin coating against ultraviolet radiation, ozone, oxygen, and the like. Typical stabilizers utilized for UV protection include carbon black and sterically-hindered amine light stabilizers such as Tinuvin 328 which is manufactured by Ciba-Geigy. Ozone protectants include amino phenols such as Suconox−4, −9, −12, and −18, manufactured by Miles Chemical. Oxygen protectants include amino phenols such as Ethanox 703 manufactured by Ethyl.

Various fillers or extenders include carbon black and flatting or leveling agents which improve the appearance of coating 5 such as clay, silica, etc.

The first embodiment 1 of the present invention is prepared in the following manner. Elastomer substrate and coating 5 are coextruded in any suitable extrusion apparatus in a conventional manner as is well known to the art and to the literature. Elastomeric substrate 2 generally is extruded at a temperature of from about 60° C. to about 150° C. Coextruding coating 5 is brought into contact with the extruding uncured elastomeric substrate by passing the coating through a die adjacent to the area of the extruding apparatus where the elastomer substrate exits. More particularly, coating 5 must be brought to and maintained at a certain processing temperature which generally is from about −10° C. to about 50° C.; desirably from about 0° C. to about 50° C.; preferably from about 0° C. to about 40° C.; and most preferably from about 15° C. to about 30° C. above the melt temperature of the particular base polymer of which the coating is formed. The processing temperature must be maintained until the coating and elastomer substrate exit the die. In order to pass the low melt index or high molecular weight, substantially melted coating through the die, some pressure must be maintained on the coating to obtain optimum flow through the die. If coating 5 is polypropylene-based, this processing temperature generally is greater than about 200° C. If coating 5 is polyethylene-based, the processing temperature is from about 160° C. to about 170° C. If coating 5 is a block copolymer of polyethylene and polypropylene, the processing temperature is greater than about 200° C. If coating 5 is based on a random polyethylene-polypropylene copolymer which is polypropylene rich, the processing temperature is generally about 190° C., and if the random polyethylene-polypropylene copolymer is polyethylene rich, the processing temperature is from about 160° C. to about 170° C. After the polyolefin coating 5 is brought in contact with uncured elastomeric substrate 2, glass run channel 1 is passed through a curing oven in a manner well known to those skilled in the art. After passage through the curing oven, glass run channel 1 then is allowed to cool to the final product. It is important to note that the processing temperature of polyolefin coating 5 must be high enough within the above-discussed ranges to allow proper processing thereof, but cannot be too high or the elastomeric substrate could scorch and degrade. Glass run channel 1 desirably includes coating 5 having a thickness of from about 0.2 to about 0.4 mm, and preferably from about 0.2 to about 0.3 mm.

Figure 4:
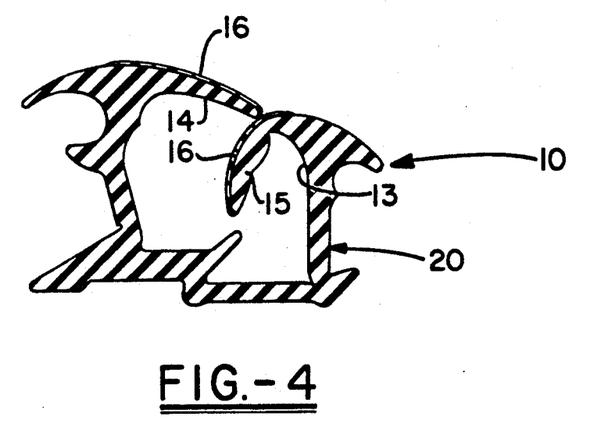
FIG. 4 is a cross-sectional view of a second embodiment of a glass run channel having the coating of the present invention applied thereto.
Figure 5:
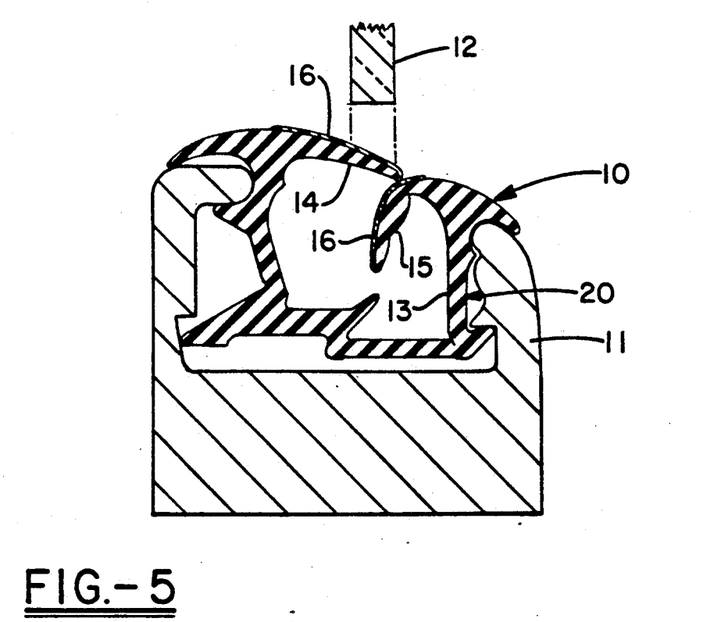
FIG. 5 is a cross-sectional view of the coated glass run channel of FIG. 4, shown mounted in a window frame of an automobile door, and showing window glass just prior to entering the coated glass run channel.
Figure 6:
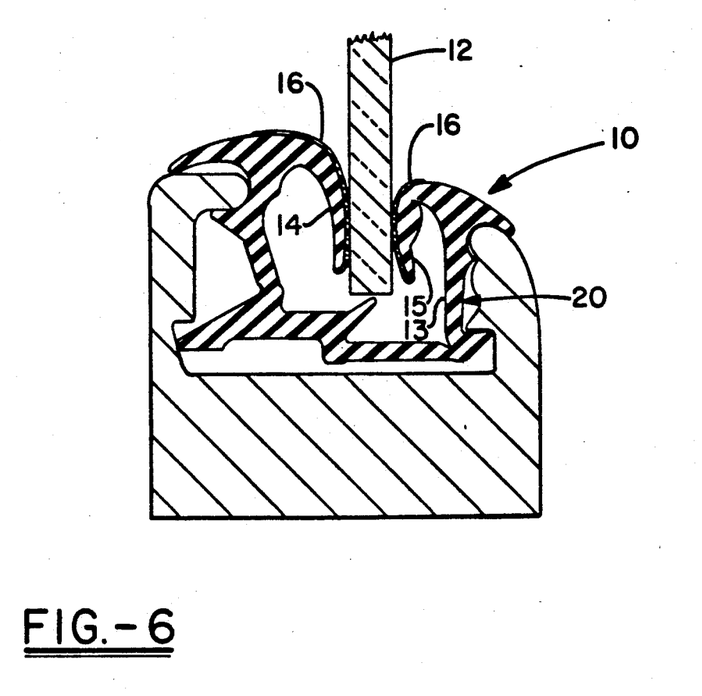
FIG. 6 is a view similar to FIG. 5, showing the window glass introduced into the glass run channel and sealed against the coated lips of the channel.

A second embodiment of a glass run channel having the coating of the present invention applied thereto is indicated generally at 10 and is shown in FIGS. 4 through 6. Glass run channel 10 is similar to glass run channel 1 described above in most respects including its general composition and method of manufacture, which is hereby fully incorporated by reference, except that glass run channel 10 is larger and has a different configuration. Glass run channel 1 is an integrally formed one-piece member and includes a channel member or substrate 20 which is shown mounted in a window frame 11 of an automobile door in FIG. 5, which also shows window glass 12 just prior to introduction into a channel 13 defined by substrate 20. Substrate 20 includes a pair of similar, inwardly extending opposed lips 14 and 15 which extend generally horizontally across channel 13, and FIG. 6 shows glass 12 introduced into channel 13 and sealed against lips 14 and 15 thereof, which have a polyolefin coating 16 of the invention applied thereto.

The invention will be better understood by the following example(s).

EXAMPLE 1

Samples 1 and 2 were pressed out in a 170° C. mold into thin sheets which were subsequently cooled, removed from the press, and then applied to an uncured EPDM sheet which was then itself cured at 160° C. Samples 3 and 4 were mixed in a 2B Banbury mixer at 120° C. and 116 rpm rotor speed. The temperature of the materials rose to 175° C. during mixing. The materials then were sheeted off on a hot mill and the above procedure repeated. Samples 3 and 4 then were pressed out into thin sheets at 170° C., applied to uncured EPDM, which EPDM sheet was subsequently cured at 160° C. for 10 minutes. Screening tests performed included the Crockmeter for abrasion, ASTM D-1894 for friction against glass, and 180° peel for adhesion. The results for the screening tests are set forth below in Table I.

TABLE I

| Composition | (PTFE/Silicone oil, phr) | Sample 1 | Sample 2 | Sample 3 | Sample 4 |
| --- | --- | --- | --- | --- | --- |
| Santoprene (101-55) | | 0 | 0 | 30 | 70 |
| Polypropylene | (14/2.3) | 0 | 100 | 70 | 30 |
| Polyethylene | (14/2.3) | 100 | 0 | 0 | 0 |
| Film on EPDM | | | | | |
| Thickness (mm) | | 0.235 | 0.280 | 0.254 | 0.254 |
| Crockmeter Abrasion Life (cycles) | | 13,000 | >84,000 | 53,500 | 27,800 |
| Cycles/μm | | 55 | >300 | 210 | 109 |
| ASTM Friction Coefficient* | | 0.36 | 1.0 | 0.74 | 0.98 |
| Specimen Hardness | | 82 | 87 | 85 | 76 |

TABLE I-continued

| Composition | (PTFE/Silicone oil, phr) | Sample 1 | Sample 2 | Sample 3 | Sample 4 |
|---|---|---|---|---|---|
| (Shore A) Adhesion | | Excellent | Excellent | Excellent | Excellent |

*240 g on 3, 0.6 cm diameter disks on glass

As shown above in Table I, even a thin 0.2 to 0.3 mm thick coating of either polyethylene or polypropylene resulted in a large increase in hardness over the normal Shore A hardness of EPDM, which is 75. Such a large increase in hardness is undesirable for good flexibility and sealing to glass in glass run channel applications. As further shown in the Table, the polyethylene and polypropylene used in Samples 1 to 4 contained 14 percent PTFE particulates and 2.3 percent silicone oil. These optional ingredients were added to the polymers by the supplier thereof. Samples 3 and 4 demonstrate the use of a softening aid, in this case Santoprene, to reduce the laminate hardness from a Shore A of 87 for the polypropylene coating in Sample 2, to 76 in Sample 4. In addition, the improvement for polypropylene over polyethylene in Crockmeter abrasion resistance can be seen by comparison of Samples 1 and 2 of Table I. Polyethylene also displayed a lower friction than did polypropylene as illustrated by Samples 1 and 2 of Table I.

EXAMPLE 2

Samples 5 through 7 and 9 through 14 were prepared in the same manner as Samples 3 and 4 above in Table I. Sample 8 was prepared in the same manner as Samples 1 and 2 in Table I.

TABLE II

| Composition | (PTFE/Silicone oil, phr) | Sample 5 | Sample 6 | Sample 7 | Sample 8 | Sample 9 |
|---|---|---|---|---|---|---|
| Santoprene (101-55) | | 50 | 50 | 50 | — | — |
| Santoprene (103-50) | | — | — | — | 100 | 100 |
| Polypropylene | (14/2.3) | 50 | 50 | 50 | — | — |
| MoS$_2$ | | — | 30 | — | — | — |
| Microspherical Glass Beads | | — | — | 15 | — | 10 |
| Film on EPDM | | | | | | |
| Thickness (mm) | | 0.500 | 0.254 | 0.254 | 0.15 | 0.21 |
| Crockmeter Abrasion Life (Cycles) | | 105,500 | 45,100 | >159,000 | 10,000 | 45,000 |
| Cycles/μm | | 211 | 178 | >626 | 67 | 214 |
| ASTM Friction Coefficient* | | 0.76 | 0.80 | 0.88 | 0.80 | 0.87 |
| Specimen Hardness (Shore A) | | 81 | 82 | 84 | 80 | 80 |
| Adhesion | | Excellent | Excellent | Excellent | Excellent | Excellent |

*260 g on 3, 0.6 cm diameter disks on glass

TABLE III

| Composition | (Teflon/Silicone oil, phr) | Sample 10 | Sample 11 | Sample 12 | Sample 13 | Sample 14 |
|---|---|---|---|---|---|---|
| Santoprene (101-55) | | 50 | 50 | 50 | 50 | 50 |
| Polypropylene | (23/2.5) | 50 | 0 | 0 | 0 | 0 |
| Polypropylene | (0/2) | 0 | 50 | 0 | 0 | 25 |
| Polypropylene | (25/0) | 0 | 0 | 50 | 0 | 25 |
| Polypropylene | (0/0) | 0 | 0 | 0 | 50 | 0 |
| Microspherical Glass Beads | | 10 | 10 | 10 | 10 | 10 |
| Film on EPDM | | | | | | |
| Thickness (mm) | | .13 | .18 | .13 | .13 | .18 |
| Crockmeter Abrasion (cycles) | | 59,000 | 42,000 | 116,000 | 40,000 | 36,500 |
| Cycles/μm | | 454 | 233 | 913 | 307 | 202 |
| ASTM Friction Coefficient* | | 0.68 | 0.55 | 0.53 | 0.70 | 0.81 |
| Specimen Hardness (Shore A) | | 78 | 76 | 77 | 78 | 77 |
| Adhesion | | Excellent | Excellent | Excellent | Excellent | Excellent |

*240 g on 3, 0.6 cm diameter disks on glass

Samples 5 through 14 illustrate that the polyolefin coatings of the present invention resulted in only modest increases in specimen hardness above that of the EPDM substrate which has a Shore A hardness of 75. High levels of additives such as molybdenum disulfide as utilized in Sample 6 offered no improvement in friction coefficient or abrasion resistance as compared to Sample 5 which lacked such an additive. The greatest improvement in abrasion index was achieved with the addition of microspherical glass beads as illustrated by comparing Sample 5 with Sample 7 which had an abrasion index greater than 626 cycles per micrometer as compared to 211 cycles for Sample 5. The glass beads used were microspherical glass beads manufactured by Potters Industries. The particle size was 44 micrometers and less. The glass beads had a coating recommended for use with polypropylene. Larger as well as smaller particles also are believed to give good results. However, larger particles would be undesirable if they caused difficulties in coating processes such as coextrusion or if they yielded an objectionally rough surface. For glass loadings greater than 15 phr in the polypropylene based coatings, objectionable noise resulted on the Crockmeter test. Levels of 10 phr and less gave no such problem. Samples 8 and 9 of Table II above are included as comparative examples of coatings prepared only with a commercial material, that is Santoprene 103-50. The Santoprene 103-50 merely is a harder grade of Santoprene than Santoprene 101-55. The hardness of Santoprene 103-50 is near that of the coatings of the present invention. The use of Santoprene 103-50 alone as illustrated in Sample 8 resulted in poor abrasion resistance. The addition of microspherical glass beads as in Sample 9 resulted in poorer abrasion and higher friction than in Sample 12 of Table III which is a Santoprene/polypropylene blend. As shown in Table III for 50/50 blends of polypropylene/Sanoprene, the best composition for high abrasion resistance and low friction was achieved in Sample 12. The polypropylene used in this sample included 25 phr of polytetrafluoroethylene (PTFE) particulates. Lower levels of PTFE had little effect on abrasion resistance. Silicone oil addition did lower friction but also lowered abrasion resistance as shown by comparing Samples 11 and 13. The film material in Sample 11 was also successfully coextruded as a smooth thin film onto an EPDM substrate. Subsequent curing in a circulating air oven gave a film with a smooth surface. The material of Sample 11 is compatible with EPDM processing conditions.

Thus, Samples 2 through 14 of Tables I-III above, demonstrate the class of materials of the present invention which contain polypropylene and therefore require processing temperatures exceeding about 200° C. The following examples demonstrate another class of materials based on polyethylene which process at temperatures 30° C. or more lower than for polypropylene-based materials. Both classes of coatings yield excellent adhesion with cohesive substrate failure without requiring surface treatments or primer layers containing undesirable solvents.

EXAMPLE 3

Samples 15 through 20 each was mixed and prepared in the same manner as previously discussed Samples 3 and 4 of Table I above.

TABLE IV

| Composition | (Density/Melt Index) | Sample 15 | Sample 16 | Sample 17 | Sample 18 | Sample 19 | Sample 20 |
|---|---|---|---|---|---|---|---|
| Polyethylene (Cain) | (.962/1.0) | 100 | — | — | — | — | — |
| Polyethylene (Cain) | (.953/7.0) | — | 100 | — | — | — | — |
| Polyethylene (Cain) | (.957/52) | — | — | 100 | — | — | — |
| Polyethylene (Dow) | (.921/5.4) | — | — | — | 100 | — | — |
| Polyethylene (Dow) | (.923/55) | — | — | — | — | 100 | — |
| Polyethylene Surlyn Ionomer (Dupont) | (.950/1.1) | — | — | — | — | — | 100 |
| Microspherical Glass Beads | | 10 | 10 | 10 | 10 | 10 | 10 |
| N 330 Carbon Black | | 2 | 2 | 2 | 2 | 2 | 2 |
| Film on EPDM | | | | | | | |
| Thickness | | 0.21 | 0.21 | 0.15 | 0.30 | 0.18 | 0.21 |
| Crockmeter Abrasion (Cycles) | | 54,000 | 45,000 | 12,000 | 5,000 | 300 | 2,000 |
| Cycles/μm | | 257 | 214 | 80 | 15 | 1.7 | 9.5 |
| ASTM Friction Coefficient* | | 0.19 | 0.23 | 0.28 | 0.70 | 1.18 | 0.54 |
| Specimen Hardness (Shore A) | | 85 | 85 | 92 | 81 | 79 | 85 |
| Adhesion | | Excellent | Excellent | Excellent | Excellent | Excellent | Fair |

*240 g on 3, 0.6 cm diameter disks on glass

Samples 15 through 20 of Table IV above demonstrate the use of polyethylenes with a range of density and melt indexes. The samples each contained microspherical glass beads, a small amount of carbon black for ultraviolet protection, and were free of softening agents. Density is a convenient way to describe the degree of crystallinity of polyethylene, and melt index is a measure of how many grams of polymer will flow through a prescribed die at a specified load and temperature. A high melt index indicates a low molecular weight and vice versa. Samples 15 through 19 demonstrate the increase in abrasion resistance and reduction in friction for comparable density materials with decreasing melt index. Higher density materials as in Samples 15 through 17 have higher abrasion resistance and lower friction than lower density materials as in Samples 18 and 19. Sample 20 is a commercial polyethylene ionomer, Surlyn 9520, advertised by its manufacturer as having high abrasion resistance. However, this material has higher friction with adhesion failure upon tearing when compared with Samples 15 through 17 which gave cohesive failure of the substrate upon tearing.

EXAMPLE 4

Samples 21 through 27 in Tables V and VI below were prepared as follows:

A 2B Banbury mixer was heated to 90° C. and operated at a rotor speed of 116 rpm. The non-curative ingredients then were added, and the curatives were added when the temperature reached 160° C. The samples were mixed until three minutes after the wattmeter leveled out, then dropped, cooled, and mixed two additional minutes in the Banbury. Preparation of the laminate was then carried out in the same manner as for Samples 3 and 4 discussed above in Table I. Samples 28 and 29 were prepared in the same manner as Samples 3 and 4, and Sample 30 was prepared in the same manner as Samples 1 and 2.

TABLE V

| Composition | Sample 21 | Sample 22 | Sample 23 | Sample 24 | Sample 25 | Sample 26 |
|---|---|---|---|---|---|---|
| Royalene 525 EPDM | 100 | 100 | 100 | 100 | 100 | 100 |
| Polyethylene from USI Melt Index = 12, Density = .955 | 65 | 65 | 150 | 150 | 100 | 100 |
| N110 Carbon Black | 5 | 5 | 8 | 8 | 6.3 | 6.3 |
| Stearic Acid | 0.5 | 0.5 | 0.5 | 0.5 | 0.5 | 0.5 |
| Zinc Oxide | 2.5 | 2.5 | 2.5 | 2.5 | 2.5 | 2.5 |
| Sulphur Curatives | 5 | 5 | 5 | 5 | 5 | 5 |
| Microspherical Glass Beads | 0 | 17 | 25 | 0 | 20.4 | 40.8 |
| Ultra-High Molecular Weight Polyethylene | 0 | 17 | 0 | 25 | 10 | 10 |
| Film on EPDM | | | | | | |
| Thickness (mm) | 0.27 | 0.33 | 0.30 | 0.27 | 0.30 | 0.27 |
| Crockmeter Abrasion Life (Cycles) | 10,300 | 145,700 | 40,600 | 64,500 | 54,100 | 276,400 |
| Cycles/μm | 38 | 442 | 135 | 239 | 217 | 1024 |
| ASTM Friction Coefficient* | 1.11 | 0.87 | 0.59 | 0.53 | 0.69 | 0.69 |
| Specimen Hardness (Shore A) | 80 | 80 | 81 | 84 | 81 | 82 |
| Adhesion | Excellent | Excellent | Excellent | Excellent | Excellent | Excellent |

*240 g on 3, 0.6 cm diameter disks on glass.

TABLE VI

| Composition | (Density/Melt Index) | Sample 27 | Sample 28 | Sample 29 | Sample 30 |
|---|---|---|---|---|---|
| Polyethylene (Cain) | (0.962/1.0) | 100 | — | — | — |
| Royalene 525 (EPDM) | | 100 | — | — | — |
| N110 Carbon Black | | 13 | 7 | 14 | — |
| Stearic Acid | | 0.5 | — | — | — |
| Zinc Oxide | | 2.5 | — | — | — |
| Sulphur Curatives | | 5.0 | — | — | — |
| Microspherical Glass Beads | | 30 | 20 | 20 | — |
| Ultra-High Molecular Weight Polyethylene | | 7 | — | — | — |
| Tinuvin 328 (Ultraviolet Light Stabilizer) | | 1 | 1 | 1 | — |
| Santoprene 101-55 (Polypropylene/EPDM blend) | | — | — | 100 | — |
| Polypropylene (Teflon 25 phr) | | — | — | 100 | — |
| Dytron 7100 (Polyethylene/EPDM blend) | | — | 100 | — | 100 |
| Adhesion - 180° peel (pounds/inch)* | | | | | |
| Laminated then rubber subsequently cured at 160° C. | | | | | |
| EPDM | | **17.3 (100) | 15.6 (100) | 21.9 (100) | 18.6 (100) |
| NR - natural rubber | | 29.8 (100) | | 13.3 (5) | |
| SBR - styrene-butadiene rubber | | 49.3 (100) | | 10.0 (5) | |
| BR - butadiene rubber | | 18.0 (100) | | 4.1 (0) | |
| PU - polyurethane rubber | | | | 0.5 (0) | |
| NBR - nitrile-butadiene rubber containing 40% acrylonitrile | | | | 0.2 (0) | |
| Silicone Rubber | | | | 0.7 (0) | |
| Lamination following rubber cure | | | | | |
| EPDM | | ***13.0 (100) | 16.6 (100) | 11.4 (0) | |
| NR - natural rubber | | 4.9 (0) | | 0.9 (0) | |
| SBR - styrene-butadiene rubber | | 1.3 (0) | | 0.7 (0) | |
| BR - butadiene rubber | | 2.4 (0) | | 0.5 (0) | |
| Film on EPDM | | | | | |
| Thickness (mm) | | 0.24 | 0.24 | 0.24 | 0.24 |
| Crockmeter Abrasion Life (Cycles) | | 135,000 | 69,000 | 110,000 | 25,000 |
| Cycles/μm | | 562 | 288 | 458 | 104 |
| ASTM Friction Coefficient* | | 0.55 | 0.71 | 0.99 | 0.99 |
| Specimen Hardness (Shore A) | | 82 | 81 | 81 | 82 |

*NR, SBR, BR, NBR and PU compounds contained 41 phr carbon black, 4 phr process aids, with normal levels of sulfur curatives. Silicone rubber contained silica filler and was peroxide cured.
**Number in parenthesis is percentage rubber tearing with 100 and 0 referring to cohesive and adhesive failure, respectively.
***Tearing near interface
*240 g on 3, 0.6 cm diameter disks on glass Samples 21 through 26 set forth in Table V above demonstrate the use of softening agents for this class of polyethylene-based materials. These materials were dynamically vulcanized with sulfur curatives for EPDM to give cured EPDM rubber particles in the polyethylene continuous phase which softened the polyethylene. Various levels of glass beads were used for improved abrasion. Various levels of ultra-high molecular weight polyethylene were also used for improved processing. As an alternative approach, coatings were made from EPDM plus curatives and polyethylene powders and were applied without melting the polyethylene and subsequently cured. The intent was to process the polyolefin powder as solid reinforcement. The resulting coatings had poor surface appearance and abrasion resistance. The high levels of glass beads in combination with high levels of ultra-high molecular weight polyethylene as shown in Samples 22 and 26 resulted in excellent abrasion resistance. Without either glass beads or ultra-high molecular weight polyethylene, abrasion resistance is only marginal as shown in Sample 21. Excellent abrasion results with low friction were obtained for Samples 22 and 26. The high level of glass beads used in Sample 26 resulted in no noise problem as observed for polypropylene based materials as discussed above in Sample 7 of Table II discussed above.

Samples 27 through 29 as set forth in Table VI above demonstrate the unexpectedly excellent adhesion when uncured EPDM, natural rubber, styrene-butadiene rubber and butadiene rubber were laminated with the polyolefin coatings of the present invention and subsequently cured rather than applied to the precured rubber. The results in Table VI for Sample 29 also demonstrate the poor adhesion of coatings of the present invention to polyurethane rubber, high acrylonitrile content nitrile rubber, and silicone rubber, which have very different solubility parameters than the coating materials. This demonstrates the requirement that the solubility parameters of the substrate must be close to that of the coating for good adhesion if no chemical bonding enhancers or primers are used. In addition, the results show that the presence of a common co-unit in the coatings and certain of the substrates encourages compatibility and results in good adhesion. Table VI further demonstrates the use of Dytron 7100, a commercially available dynamic vulcanizate of polyethylene with cured particles of EPDM. Sample 28 containing Dytron plus optional microspherical glass beads and carbon black shows improved abrasion resistance and low friction when compared with Sample 30 containing Dytron alone which demonstrates only marginal abrasion resistance and reduced friction. Preferred samples of the current invention are Samples 22 to 29 due to their good adhesion, abrasion resistance and friction, and also because they contain additives such as carbon black or carbon black and the UV protection aid (Tinuvin 328) for good weatherability.

Thus, it can be seen that a glass run channel having the solventless, polyolefin coating of the present invention applied thereto possesses good sealing properties, yet is abrasion-resistant and low friction to provide long life to the channel and ease of cranking for a vehicle window. The use of various polyolefins in the process of production for the glass run channel of the present invention allows for a range of melting points, such that the higher melt temperature of polypropylene may be desirable when applying to substrates destined for high temperature end use applications, and the lower melting temperature of polyethylene may be desirable during processing of certain substrates to avoid scorch of the selected elastomeric substrate. Moreover, coextrusion of the coating of the present invention eliminates waste such as occurs when solvent sprays are used, due to overspray, etc., so that use of a solid polyolefin coating as in the present invention is more efficient and economical.

While in accordance with the Patent Statutes, the best modes and preferred embodiments have been set forth, the scope of the invention is not limited thereto, but rather by the scope of the attached claims.

What is claimed is:

1. A method for forming a composite, comprising the steps of:
   contacting a solvent-free, substantially melted polyolefin compound with an uncured elastomeric substrate, said polyolefin compound having a low melt index and a high density, and optionally containing a softening compound; and
   curing said elastomeric substrate, so that said polyolefin compound is adhered to said elastomeric substrate and provides a solid, low-friction, abrasion-resistant coating on said substrate.

2. A method of forming a composite, comprising the steps of:
   coextruding a solvent-free polyolefin compound and an uncured elastomeric substrate, said polyolefin compound having a melt index of from about 0.1 to about 10, a density of from about 0.89 to about 0.96 and being from about 50 percent to about 100 percent melted; and
   curing said elastomeric substrate.

3. The method of claim 2, including the steps of
a) processing the polyolefin compound at from about 10° C. below to about 50° C. above the melting temperature of said polyolefin compound and b) processing the elastomeric substrate at a temperature of from about 60° C. to about 150° C.

4. The method of claim 3, including the step of processing the polyolefin compound having a melt index of from about 0.2 to about 5, at from about the melting temperature to about 50° C. above the melting temperature of said polyolefin compound, so that said polyolefin compound is from about 75 percent to about 100 percent melted.

5. The method of claim 4, including the steps of a) processing the polyolefin compound at from about the melting temperature to abut 40° C. above the melting temperature of said polyolefin compound, so that said polyolefin compound is at least 95 percent melted and b) coextruding said polyolefin compound at a thickness of from about 0.2 mm to about 0.4 mm.

6. The method of claim 5, including the steps of a) processing said polyolefin compound having a melt index of between 0.2 and 1, at between 15° C. and 30° C. above the melting temperature of said polyolefin compound, so that said polyolefin compound is substantially melted and b) coextruding said polyolefin compound at a thickness of between 0.2 mm and 0.3 mm.

7. A method of forming a composite, comprising the steps of:
   contacting a solvent-free, substantially melted polyolefin compound with an uncured elastomeric substrate, said polyolefin compound having a low melt index and a high density; and
   curing said elastomeric substrate, so that said polyolefin compound is adhered to said elastomeric substrate.

8. The method of claim 7, including the steps of a) processing the polyolefin compound at from about 10° C. below to about 50° C. above the melting temperature of said polyolefin compound and b) processing the elastomeric substrate at a temperature of from about 60° C. to about 150° C.

9. The method of claim 8, wherein the polyolefin compound is at least 50 percent melted, said polyolefin compound having a density of from about 0.89 to about 0.96 and a melt index of from about 0.1 to about 10.

10. The method of claim 9, including the step of processing the polyolefin compound at from about the melting temperature to about 50° C. above the melting temperature of said polyolefin compound, so that said polyolefin compound is at least 75 percent melted.

11. The method of claim 10, including the steps of a) processing the polyolefin compound having a melt index of from about 0.2 to about 5, at from about the melting temperature to above 40° C. above the melting temperature of said polyolefin compound, so that said polyolefin compound is at least 95 percent melted and b) coextruding said polyolefin compound at a thickness of from about 0.2 mm to about 0.4 mm.

12. The method of claim 11, including the step of a) processing the polyolefin compound having a melt index of between 0.2 and 1, at between 15° C. and 30° C. above the melting temperature of said polyolefin compound, so that said polyolefin compound is substantially melted and b) coextruding said polyolefin compound at a thickness of not more than 0.3 mm.

* * * * *